United States Patent [19]

Yoneyama

[11] Patent Number: 5,295,015
[45] Date of Patent: Mar. 15, 1994

[54] OPTICAL AMPLIFYING APPARATUS
[75] Inventor: Kenichi Yoneyama, Tokyo, Japan
[73] Assignee: NEC Corporation, Tokyo, Japan
[21] Appl. No.: 24,225
[22] Filed: Mar. 1, 1993
[30] Foreign Application Priority Data Feb. 27, 1992 [JP] Japan .................................. 4-76278

[51] Int. Cl.⁵ .......................................... H04J 14/02
[52] U.S. Cl. ................... 359/333; 359/337; 359/110
[58] Field of Search ............... 359/110, 176, 177, 333, 359/337, 341

[56] References Cited

U.S. PATENT DOCUMENTS 4,918,396  3/1990  Halemave et al. ................. 372/31 X
  4,945,531  7/1990  Suzuki ................................. 455/617
  4,947,459  8/1990  Nelson et al. ...................... 455/600

FOREIGN PATENT DOCUMENTS 2175766 12/1986 United Kingdom .

*Primary Examiner*—Mark Hellner
*Attorney, Agent, or Firm*—Sughrue, Mion, Zinn, Macpeak & Seas

[57] ABSTRACT

An optical amplifying apparatus of the present invention has an optical amplifier for directly amplifying an input signal, and an optical splitter for reflecting a noise light which occurs in the amplifier and is supplied backward therefrom. An amount of the backward noise light is used to detect an S/N ratio of an output light or the like.

11 Claims, 2 Drawing Sheets

OPTICAL AMPLIFYING APPARATUS

FIELD OF THE INVENTION

This invention relates to an optical amplifying apparatus, and more particularly, to an optical amplifying apparatus used in an optical transmission system.

BACKGROUND OF THE INVENTION

An optical amplifying apparatus for directly amplifying a light signal has been now developed in a variety of technical fields such as an optical communication system. Recently, an optical amplifying apparatus using an optical fiber amplifier, in which rare-earth element or the like is doped to an optical fiber, has been proposed. The optical fiber amplifier amplifies a light signal when a predetermined excitation light is supplied thereto. One kind of such an optical amplifying apparatus is described in UK Patent Publication "GB-2175766A".

In such an optical amplifying apparatus, a noise light occurs in an optical direct amplifier because of the amplifying theory of the amplifier, the structural reason and the like. For the purpose of monitoring operating condition of the optical amplifier, a conventional optical amplifying apparatus is provided with a detector for detecting noise occurring in the amplifier.

A conventional optical amplifying apparatus includes an optical direct amplifier for amplifying an input signal light directly, an optical (or beam) splitter for splitting the amplified light, and an optical filter for detecting a noise light occurring in the optical amplifier. The optical filter has a bandstop function in that a signal light having a narrow wavelength band is attenuated thereat and a noise light having a relatively wide wavelength band passes therethrough.

In the conventional optical amplifying apparatus, an S/N ratio of an output signal is determined in accordance with an amount of the detected noise light.

According to the conventional optical amplifying apparatus, however, there is a disadvantage in that the optical filter must have high performance, because it is required to detect only a noise light with high precision.

SUMMARY OF THE INVENTION

Accordingly, it is an object of the invention to provide an optical amplifying apparatus in which a noise light occurring in an optical amplifier can be detected with high precision by a simple structure.

According to the invention, an optical amplifying apparatus includes:

an optical amplifier for directly amplifying an input light;

means for detecting a backward noise light which occurs in the optical amplifier and is supplied backward therefrom; and means for calculating an amount of a noise light to be contained in an output light in accordance with a detected result of the detecting means.

The other objects and features of the invention will become understood from the following description with reference to the accompanying drawings.

DESCRIPTION OF THE PREFERRED EMBODIMENTS

For better understanding the background of the present invention, the basic principle of the conventional technology is first described hereinafter with reference to FIG. 1.

Figure 1:
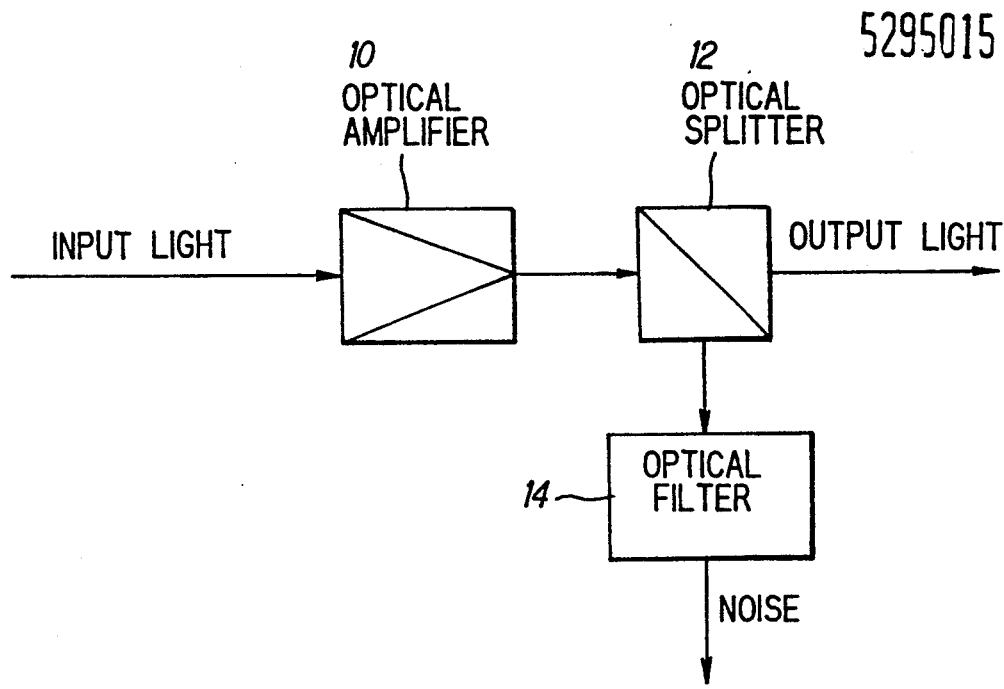
FIG. 1 is a block diagram showing a conventional optical amplifying apparatus.

FIG. 1 shows a conventional optical amplifying apparatus. The conventional optical amplifying apparatus includes an optical amplifier 10 to which an input signal light is supplied, an optical (or beam) splitter 12 connected to the optical amplifier 10, and an optical filter 14 connected to the optical splitter 12.

In the conventional optical amplifying apparatus, when an input signal light is supplied to the optical amplifier 10, the input signal light is amplified and supplied to the optical splitter 12. The amplified signal light is divided into two lights by the optical splitter 12. One of the two lights is transmitted to the next stage as an output light, and the other is supplied to the optical filter 14. At this time, a noise light passes through the optical filter 14, and a signal light is attenuated thereat. In accordance with the detected noise light, an amount of a noise light contained in the output light is estimated to determine a S/N ratio.

According to the conventional optical amplifying apparatus, however, there is a disadvantage in that the optical filter 14 must have high performance, because it is required to detect only noise light with high precision.

Figure 2:
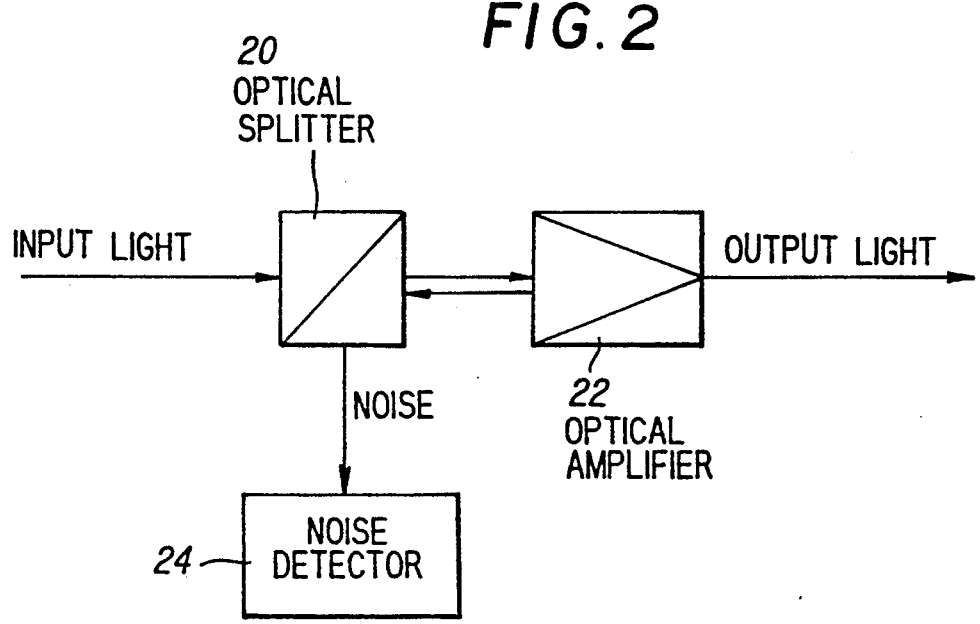
FIG. 2 is a block diagram showing an optical amplifying apparatus of a first preferred embodiment according to the invention.

FIG. 2 shows an optical amplifying apparatus of a first preferred embodiment according to the invention. The optical amplifying apparatus includes an optical (or beam) splitter 20 to which an input signal light is supplied, an optical amplifier 22 connected to the optical splitter 20, and a noise detector 24 connected to the optical splitter 20.

The optical splitter 20 is of a photocoupler, an optical circulator, an optical filter or the like. The optical amplifier 22 is of a semiconductor laser amplifier or the like.

In operation, when an input signal is supplied to the optical splitter 20, the input signal light passes therethrough and is supplied to the optical amplifier 22. In the optical amplifier 22, the input signal light is directly amplified, and is transmitted to the next stage as an output light.

In the optical amplifier 22, noise light occurs and is dispersed forward and backward. As a result, some of the noise light (forward noise light) is contained in the output light, and the other (backward noise light) is supplied to the optical splitter 20. At this time, no signal light is supplied backward from the optical amplifier 22 due to avalanche effect of the amplifier.

When the backward noise light is supplied to the optical splitter 20, all of the backward noise light is reflected thereat. When the reflected noise light is supplied to the noise detector 24, an amount of the backward noise light is detected, and an amount of the forward noise light is estimated in accordance with the amount of the backward noise light, because athe correlation between the forward and backward noises is obtained in advance. Therefore, an S/N (signal to noise) ratio of the output light is calculated in accordance with the amount of the forward noise light.

The noise detector 24 may have a correlation map between the backward noise light and the forward noise light. The correlation map can be prepared by using a measuring instrument such as an optical spectrum analyzer for measuring the both noise lights. Therefore, an S/N ratio of the output light is easy to be estimated.

Figure 3:
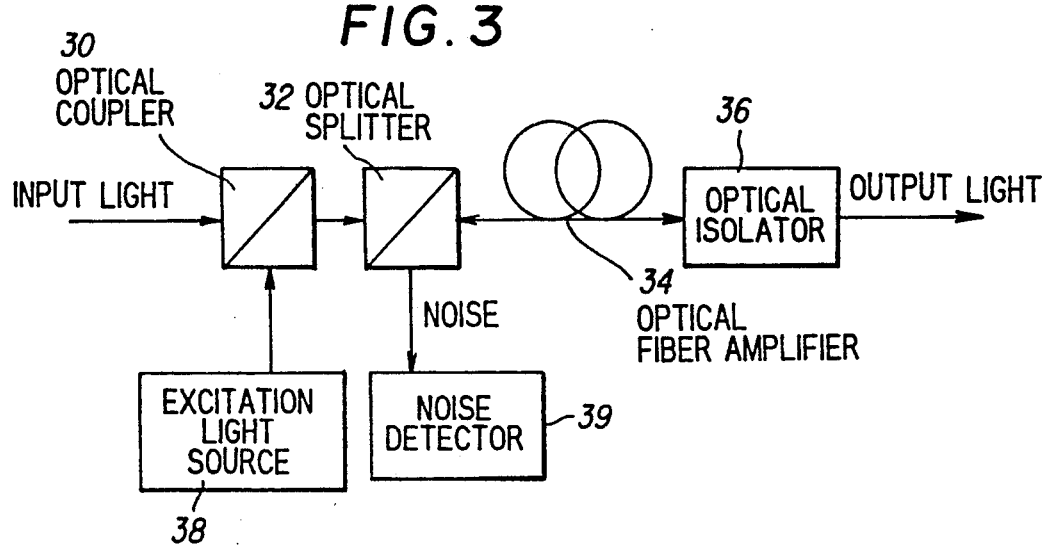
FIG. 3 is a block diagram showing an optical amplifying apparatus of a second preferred embodiment according to the invention.

FIG. 3 shows an optical amplifying apparatus of a second preferred embodiment according to the invention. The optical amplifying apparatus uses an optical fiber amplifier of rare-earth element doped type instead of the optical amplifier 22 in the first preferred embodiment shown in FIG. 2.

The optical amplifying apparatus includes an optical coupler 30 to which an input signal is supplied, an optical (or beam) splitter 32 connected to the optical coupler 30, an optical fiber amplifier 34 connected to the optical splitter 32, an optical isolator 36 connected to the optical fiber amplifier 34, an excitation light source 38 connected to the optical coupler 30, and a noise detector 24 connected to the optical splitter 32.

The excitation light source 38 supplies an excitation light for exciting the optical fiber amplifier 34. The optical fiber amplifier 34 may be of an ion doped type instead of the rare-earth element doped type. An optical waveguide may be used as an optical amplifier instead of the optical fiber amplifier 34.

In operation, when an input signal is supplied to the optical coupler 30, the input signal light is coupled with an excitation light supplied from the excitation light source 38. When the coupled light is supplied to the optical splitter 32, the light passes through the optical splitter 32 and is supplied to the optical fiber amplifier 34. At the optical fiber amplifier 34, the excitation light is absorbed therein so that the input signal light is directly amplified thereby. After that, the amplified light is transmitted through the optical isolator 36 to the next stage as an output light.

In the optical fiber amplifier 34, noise light occurs and is dispersed to forward and backward. As a result, some of the noise light (forward noise light) is contained in the output light, and the other noise light (backward noise light) is supplied to the optical splitter 32. At this time, no signal light is supplied backward from the optical fiber amplifier 34 due to avalanche effect of the amplifier. After that, an S/N (signal to noise) ratio of the output signal is calculated in the same manner as the first preferred embodiment.

Figure 4:
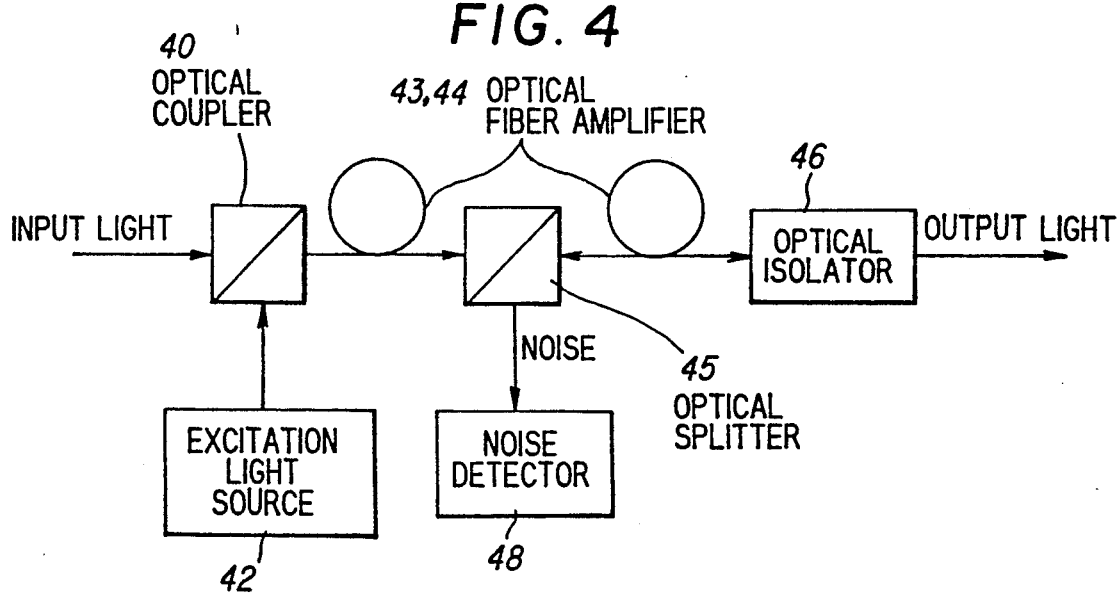
FIG. 4 is a block diagram showing an optical amplifying apparatus of a third preferred embodiment according to the invention.

FIG. 4 shows an optical amplifying apparatus of a third preferred embodiment according to the invention. In the optical amplifying apparatus, an optical (or beam) splitter 45 is connected between optical fiber amplifiers 43 and 44.

The optical amplifying apparatus includes an optical coupler 40 to which an input signal is supplied, the optical fiber amplifiers 43 and 44, the optical splitter 45, an optical isolator 46 connected to the optical fiber amplifier 43, an excitation light source 42 connected to the optical coupler 40, and a noise detector 48 connected to the optical splitter 45.

In the optical amplifying apparatus, when an input signal light is supplied to the optical coupler 30, the input signal is coupled with an excitation light supplied from the excitation light source 42. When the coupled light is supplied to the optical fiber amplifier 43, the input signal light is amplified. The amplified light is supplied to the optical splitter 45 along with induced noise, and the light is propagated supplied through the optical splitter 45 to the optical fiber amplifier 44. When the amplified light is supplied to the optical fiber amplifier 44, the light is then amplified again, and the amplified light is transmitted through the optical isolator 46 to the next stage.

At this time, some of noise light occurring in the optical fiber amplifier 44 is supplied to the optical splitter 45 as a backward noise light. Then, an S/N ratio of the output signal is calculated in the same manner as the second preferred embodiment.

According to the third preferred embodiment, the optical splitter 45 is located between the optical fiber amplifiers 43 and 44, so that S/N ratio for optical fiber amplifiers 43 and 44 is high, because a signal light which is attenuated by the optical splitter 32 is supplied to the optical fiber amplifier 34 in the second preferred embodiment, while a signal light which is not attenuated by an optical splitter is supplied to the optical fiber amplifier 43 in the third preferred embodiment.

Although the invention has been described with respect to specific embodiment for complete and clear disclosure, the appended claims are not to be thus limited but are to be construed as embodying all modification and alternative constructions that may be occur to one skilled in the art which fairly fall within the basic teaching herein set forth.

What is claimed is:

1. An optical amplifying apparatus, comprising:
   an optical amplifier for directly amplifying an input light to provide an output light, said optical amplifier generating forward and backward noise lights, said output light containing said forward noise light;
   means for detecting said backward noise light; and
   means for calculating the forward noise light contained in said output light based on the backward noise light detected by said detecting means.

2. An optical amplifying apparatus, according to claim 1, wherein:
   said detecting means comprises an optical splitter, in which said input light passes therethrough and said backward noise light is reflected thereat.

3. An optical amplifying apparatus, according to claim 1, wherein:
   said optical amplifier is an optical fiber amplifier which amplifies said input signal when a predetermined excitation light is absorbed therein.

4. An optical amplifying apparatus, according to claim 3, wherein:
   said optical fiber amplifier is of the rare-earth element doped type.

5. An optical amplifying apparatus, according to claim 3, wherein:
   said optical fiber amplifier is an optical fiber of the ion doped type.

6. An optical amplifying apparatus, according to claim 3, further comprising:
   an excitation light source for supplying said excitation light; and
   a photo-coupler for coupling said excitation light with said input signal.

7. An optical amplifying apparatus, according to claim 1, wherein:

said optical amplifier is an optical waveguide amplifier which amplifies said input signal when a predetermined excitation light is absorbed therein.

8. An optical amplifying apparatus, according to claim 7, further comprising:
   an excitation light source for supplying an excitation light; and
   a photo-coupler for coupling said excitation light with said input signal.

9. An optical amplifying apparatus, comprising:
   a first optical amplifier for directly amplifying an input light;
   a second optical amplifier for directly amplifying a signal supplied from said first amplifier;
   an optical splitter connected between said first and second optical amplifiers, wherein said input light passes therethrough and noise light occurring in said second optical amplifier is reflected thereat; and
   means for detecting said reflected noise light.

10. An optical amplifying apparatus, according to claim 9, wherein:
    said first and second optical amplifiers are optical fiber amplifiers.

11. An optical amplifying apparatus, according to claim 9, wherein:
    said first and second optical amplifiers are optical waveguide amplifiers.

* * * * *